US011335073B2

(12) United States Patent
Zeng et al.

(10) Patent No.: US 11,335,073 B2
(45) Date of Patent: May 17, 2022

(54) 3D PRINT SELECTION BASED ON VOXEL PROPERTY ASSOCIATION AND CONFLICT RESOLUTION

(71) Applicant: HEWLETT-PACKARD DEVELOPMENT COMPANY, L.P., Houston, TX (US)

(72) Inventors: Jun Zeng, Palo Alto, CA (US); Scott White, Barcelona (ES); Federico Martinez, Guadalajara (MX); Ana Del Angel, Guadalajara (MX); Gary J. Dispoto, Palo Alto, CA (US); Sebastia Cortes I Herms, Barcelona (ES)

(73) Assignee: Hewlett-Packard Development Company, L.P., Spring, TX (US)

(*) Notice: Subject to any disclaimer, the term of this patent is extended or adjusted under 35 U.S.C. 154(b) by 707 days.

(21) Appl. No.: 16/074,466

(22) PCT Filed: Sep. 26, 2016

(86) PCT No.: PCT/US2016/053776
§ 371 (c)(1),
(2) Date: Aug. 1, 2018

(87) PCT Pub. No.: WO2018/057038
PCT Pub. Date: Mar. 29, 2018

(65) Prior Publication Data
US 2019/0039368 A1 Feb. 7, 2019

(51) Int. Cl.
*G06T 19/20* (2011.01)
*G06T 17/00* (2006.01)
(Continued)

(52) U.S. Cl.
CPC ............ *G06T 19/20* (2013.01); *B29C 64/386* (2017.08); *B33Y 50/00* (2014.12); *G06F 30/17* (2020.01);
(Continued)

(58) Field of Classification Search
CPC ........ B33Y 50/00; B29C 64/386; G06F 30/17
(Continued)

(56) References Cited

U.S. PATENT DOCUMENTS 5,101,475 A * 3/1992 Kaufman ................ G06T 17/00
345/424
8,509,933 B2 * 8/2013 Steingart ............ A61C 13/0019
700/98
(Continued)

FOREIGN PATENT DOCUMENTS

WO 2015077262 A1 8/2014
WO 2015185155 A1 12/2015
(Continued)

*Primary Examiner* — Brian S Cook
(74) *Attorney, Agent, or Firm* — HP Inc. Patent Department

(57) ABSTRACT

Examples disclosed herein relate to selecting a 3D printing parameter based on voxel property association and conflict resolution. In one implementation, a processor assigns properties to a voxel of a 3D print object based on a first and second zone including the voxel and a condition of a first property associated with the first zone and a condition of a second property associated with the second zone. The processor may update the assigned properties to resolve conflicts between the properties and select a 3D printing parameter based on the assigned properties.

20 Claims, 5 Drawing Sheets

(51) Int. Cl.
*G06F 30/17* (2020.01)
*B33Y 50/00* (2015.01)
*B29C 64/386* (2017.01)
*G06F 119/18* (2020.01)

(52) U.S. Cl.
CPC .......... *G06T 17/00* (2013.01); *G06F 2119/18* (2020.01); *G06T 2219/2024* (2013.01)

(58) Field of Classification Search
USPC ............................................................ 703/6
See application file for complete search history.

(56) References Cited

U.S. PATENT DOCUMENTS

| | | |
|---|---|---|
| 9,233,504 B2 | 1/2016 | Douglas et al. |
| 10,479,121 B2* | 11/2019 | Morovic ............... G06F 3/1247 |
| 2011/0222081 A1 | 9/2011 | Yi et al. |
| 2014/0058959 A1 | 2/2014 | Isbjornssund et al. |
| 2015/0197063 A1* | 7/2015 | Shinar .................... B33Y 80/00 |
| | | 700/98 |
| 2018/0154176 A1* | 6/2018 | Gattiker ............... A61N 5/1031 |

FOREIGN PATENT DOCUMENTS

| | | |
|---|---|---|
| WO | 2016119860 A1 | 8/2016 |
| WO | 2016119869 A1 | 8/2016 |
| WO | 2016119883 A1 | 8/2016 |
| WO | 2016119899 A1 | 8/2016 |
| WO | 2016169614 A1 | 10/2016 |

* cited by examiner

3D PRINT SELECTION BASED ON VOXEL PROPERTY ASSOCIATION AND CONFLICT RESOLUTION

BACKGROUND 3D printing may be used to manufacture an object. As an example, multiple layers of material may be fused to create the object. In some cases, the 3D printed object may be heterogeneous such that it includes multiple types of material to meet different design specifications in different areas of the same object. For example, a first layer of the interior of a 3D printed object may be created from a polymer, a second layer of the object may be hollow, and a third layer may include a conductive trace. The manner in which the materials are arranged when 3D printing the object may create a property different from a property exhibited by the individual materials.

BRIEF DESCRIPTION OF THE DRAWING

The drawings describe example embodiments. The following detailed description references the drawings, wherein.

DETAILED DESCRIPTION

In one implementation, a computing system may automatically design and create a heterogeneous 3D printed object. The computing system may determine properties at a voxel level for a 3D printed object based on higher level property descriptions. For example, a processor may determine the properties of a voxel based on object properties associated with an area of the object including the voxel. In one implementation, multiple properties may be associated with the voxel, and the processor resolves conflicts between the different properties. The 3D print object specification may be segmented into different sections for different property values such that the segments may be overlapping to cause individual voxels to have different combinations of property values. As an example, a processor may assign properties to a voxel of a 3D print object based on a first and second zone including the voxel and a first property condition associated with the first zone and a second property condition associated with the second zone. The properties may relate to, for example, mechanical strength or thermal resistance properties. The processor may update the assigned properties to resolve conflicts between conditions of the first and second properties and select 3D printing parameters based on the assigned properties. A conflict resolution method may provide the freedom to divide the object into different zones for different properties and values without compromising the integrity of a heterogeneous 3D printed object. For example, the processor may simulate the behavior of a resolution option for each function objective, such as thermal resistance or structural compliance and provide information about the simulation output related to the functional performance versus material selection, such as by displaying a trade-off curve. A user may analyze the output and select a conflict resolution option. The object may be printed using 3D printing parameters resulting from the conflict resolution process.

Figure 1:
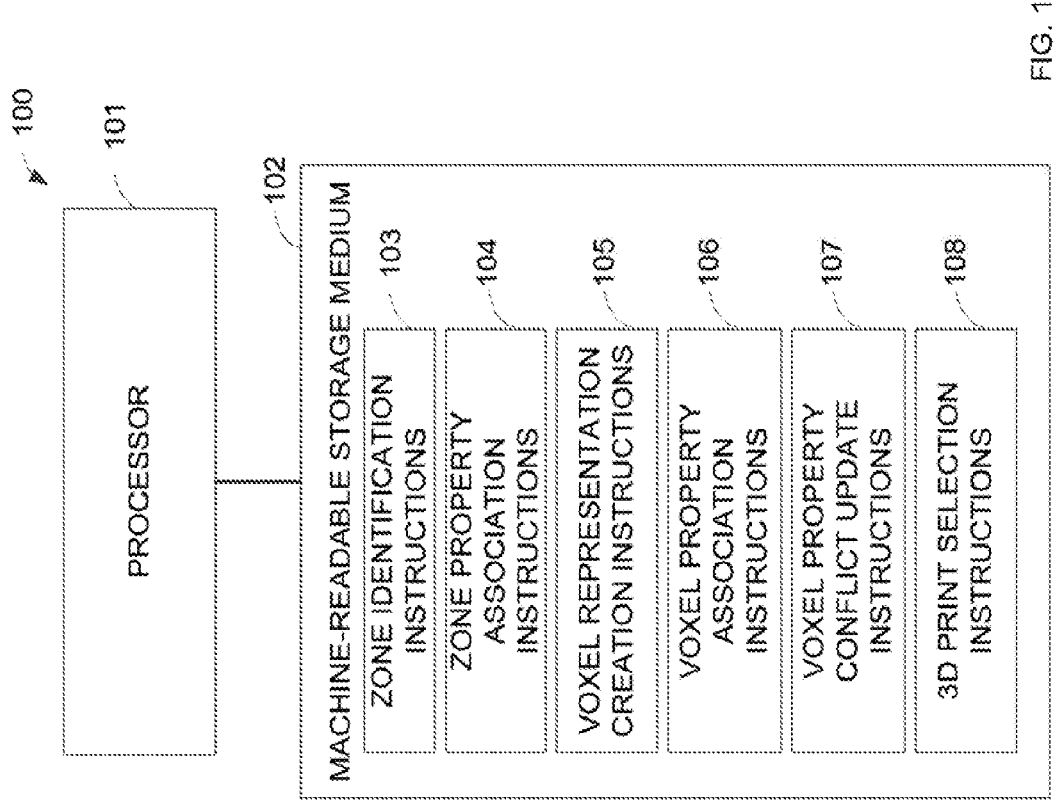
FIG. 1 is a block diagram illustrating one example of a computing system to select a 3D print parameter based on voxel property association and conflict resolution.

FIG. 1 is a block diagram illustrating one example of a computing system 100 to select a 3D printing parameter based on voxel property association and conflict resolution. The computing system 100 may determine a set of properties to associate with a voxel of a 3D object specification based on target property features for zones of the 3D object. For example, a user interface may be displayed to allow a user to select a set of properties and mark portions of the object as zones for each property. In some cases, the zones may overlap, such as where a zone for a first property condition overlaps with a zone for a different property or for a different condition of the same property. A voxel may be associated with multiple zones where each zone is associated with a different property type or condition, and in some cases the property conditions associated with the zone for the different properties may conflict. As an example, a conflict may be present when none of the options for a material for the particular voxel are able to satisfy each property associated with the voxel. The computing system 100 may update the properties associated with a voxel to resolve the conflicts and make 3D printing selections based on the updated properties. The 3D print selection, such as related to materials or processes, may then be used to print the 3D object in a manner to achieve the target properties.

The computing system 100 may include a processor 101 and a machine-readable storage medium 102. In one implementation, the computing system 100 includes a 3D printer. For example, the processor 101 and machine-readable storage medium 102 may be enclosed within a 3D printer. In one implementation, the computing system 100 is part of a cloud service that provides information to a set of 3D printers to print according to a specification determined by the cloud service. The computing system 100 may be next to or in the same facility as the related 3D printer.

The processor 101 may be a central processing unit (CPU), a semiconductor-based microprocessor, or any other device suitable for retrieval and execution of instructions. As an alternative or in addition to fetching, decoding, and executing instructions, the processor 101 may include one or more integrated circuits (ICs) or other electronic circuits that comprise a plurality of electronic components for performing the functionality described below. The functionality described below may be performed by multiple processors.

The processor 101 may communicate with the machine-readable storage medium 102. The machine-readable storage medium 102 may be any suitable machine readable medium, such as an electronic, magnetic, optical, or other physical storage device that stores executable instructions or other data (e.g., a hard disk drive, random access memory, flash memory, etc.). The machine-readable storage medium 102 may be, for example, a computer readable non-transitory medium. The machine-readable storage medium 102 may include zone identification instructions 103, zone property association instructions 104, voxel representation creation instructions 105, voxel property association instructions 106, voxel property conflict update instructions 107, and 3D print selection instructions 108.

The zone identification instructions 103 may include instructions to identify a zone of the 3D print object design related to an object to be 3D printed. The machine-readable storage medium 102 or a separate storage medium accessible to the processor 101 may store additional information related to the 3D print object, such as related to a 3D print specification. The computing system 100 may allow a user to create a 3D print specification or may receive a 3D print specification, such as via a network. The 3D print object design may be in the form of a CAD drawing, STL file, or other format indicating parameters of an object to be 3D printed.

The zone may be any suitable section of the 3D print object design. For example, a zone may encompass the entire 3D print object or a section of the 3D print object. The zone may encompass a layer of the 3D print object such that the layer surrounds a portion of or the entire 3D print object at a particular depth from the surface of the object. In one implementation, the processor 101 causes a user interface to be displayed to receive user input related to the boundary of the zone. For example, the user interface may receive user input indicating a boundary of a zone and/or information used to automatically segment the object into zones. In one implementation, a zone is created based on a distance from the surface of the object such that the zone is based on the shape of the object. For example, the user interface may receive user input related to the depth of a zone layer from the surface of the object and/or the width of the zone layer. In one implementation, user provided or stored information may be used to segment the object such that a zone boundary does not align with the shape of the surface of the object, such as based on spatial coordinates that are not directly associated with the shape of the surface of the object. The processor 101 may use the user input in determining the boundary of the zone. As an example, a zone may be created that is a particular depth from the surface of the object such that is automatically based on the shape of the object, or a zone may be manually indicated on the object. For example, the zone may be created such that it is not a uniform depth and/or width across the object. The boundary information may be automatically determined based on received or stored information, such as where the zone parameters are stored or determined based on stored information.

The zone property association instructions 104 include instructions to associate a first property condition with the zone. For example, the 3D object may be divided into a set of zones such that each zone is associated with a different property and/or property condition. For example, the set of zones may be associated with a property, such as mechanical strength or thermal resistance, and the different zones may have different conditions for the property. In one implementation, the object may be segment with a first set of zones indicating different conditions for a first property and a second set of zones indicating different conditions for a second property. A particular area of the object may be a member of both a zone within the first set and a zone within the second set such that the area is associated with multiple types of property conditions. The processor may automatically associate a property condition with a zone, such as based on stored information or user input. In one implementation, external data, such as simulation, image, or other data is used to determine a property condition and/or the associated zone boundary of the property condition.

In one implementation, the property condition associated with a zone is dependent on the object surface and/or zone boundary. The property condition may be defined as a function of the distance of a voxel from the zone boundary and/or distance of the voxel from the surface of the object. For example, a thermal resistance property may be greater the smaller the distance of a voxel to the surface of the object.

The voxel representation creation instructions 105 includes instructions to create a voxel representation of the 3D print object. The voxel representation may be any suitable volumetric representation of the 3D print object. For example, the 3D print object may be divided into voxels with an octree representation for representing relationships between the volumetric representations. The nodes in the tree may each represent a voxel, and the positon in the tree may indicate position relationship information between the individual voxels. In one implementation, the voxel information is organized as volumetric meshes, and the volumetric mesh information is stored for analysis during the 3D printing process. The processor may analyze the 3D print design, create a representation, and store information related to the created representation.

The voxel property association instructions 106 include instructions to associate the first condition of the first property with a voxel in the voxel representation based on an association between the zone and the voxel. The processor 101 may determine based on the voxel representation that the voxel is within the boundary of the zone associated with the first condition for the first property. The processor 101 may determine that the zone encompasses the voxel in any suitable manner, such as based on a comparison of the location of the zone boundary, boundary threshold rules, and distance of the voxel from the zone boundary. In one implementation, the processor 101 determines whether to associate a voxel with the zone based on boundary rules associated with the zone, such as whether the boundary is based on a specific threshold or based on a layer of the shape of the 3D object. In one implementation, the zone boundary is based on a simulation, such as related to a target overall object features where the simulation indicates a specific boundary. The property condition associated with the zone may be associated with the voxel, such as where a node in a tree representation that represents the voxel includes information about the property associated with the voxel due to the zone membership. As an example, the property may be mechanical strength, and the property condition may indicate a particular level of mechanical strength. In one implementation, the processor 101 determines the boundary such that values of a property decrease as moving away from the center of a zone to the outer edge and/or the processor 101 may blend the property conditions of two zones that border one another.

The voxel property conflict update instructions 107 may include instructions to update the first property based on a conflict with a second property associated with the voxel. For example, the voxel may be in a first zone associated with a first property condition and a second zone associated with a second property condition such that the boundaries of the two zones overlap and both include the voxel. As an example, a first property condition related to mechanical strength and a second property condition related to thermal resistance may be incompatible with one another. The conflict may involve any suitable incompatibility, such as where the two properties may not both be simultaneously present or where a quantitative range, threshold, or value of the conditions associated with the properties may not be both true. In some cases, the overlapping properties may result in the inability to identify a single material or other printing parameter for printing the voxel that can satisfy both property conditions associated with the voxel.

The conflict resolution may take place at any suitable time period, such as when a property condition is assigned or after a set of property conditions are assigned to a voxel. The processor 101 may resolve the conflict in any suitable manner. In one implementation, the processor 101 determines a set of possible solutions and receives user input related to preference of the solutions. In one implementation, the processor performs a tradeoff analysis and selects a solution based on the analysis. For example, the processor may execute a simulation comparing resulting object features with each material in a set of available materials. The results may be related to thermal resistance, structural compliance, or other features. The processor may output information related to the resulting performance compared to the material use, such as by displaying a curve indicating the relationship between performance and material selection. The processor may receive user input indicating a material selection, for example, from a user making a decision based on the displayed information. The processor may select a property based on the user input to resolve the conflict and/or may associate a 3D printing parameter to override the set of properties. The processor may perform a similar method for 3D printing process or other parameters.

The processor may automatically resolve the conflict. For example, the processor may access stored information related to property and/or printing parameter prioritization. In one implementation, the processor automatically selects a subset of options that are presented to a user.

Resolving the conflict may involve adding or removing a property, such as by changing a property condition to true or false, or changing a quantitative condition associated with at least one of the properties. The processor may store the updated property information to be associated with the voxel such that the updated information may be used at print time.

The 3D print selection instructions 108 may include instructions to select at least one of a material and a process for 3D printing the object according to the updated properties associated with the voxel. The selection may involve outputting a material assignment for a voxel, such as by storing the material with information associated with the voxel. A voxel level material assignment may be related to a build material deposited during the printing process or a property changing agent, such as a cooling or detailing agent.

The processor 101 may select the material or process based on stored information and/or based on a simulation. The processor 101 may select different materials and/or processes for different areas of the object. The 3D print parameters may be stored with the voxel information to be processed during the printing process. The computing system 100 may print the object according to the stored information or transmit the stored information to a 3D printer.

Figure 2:
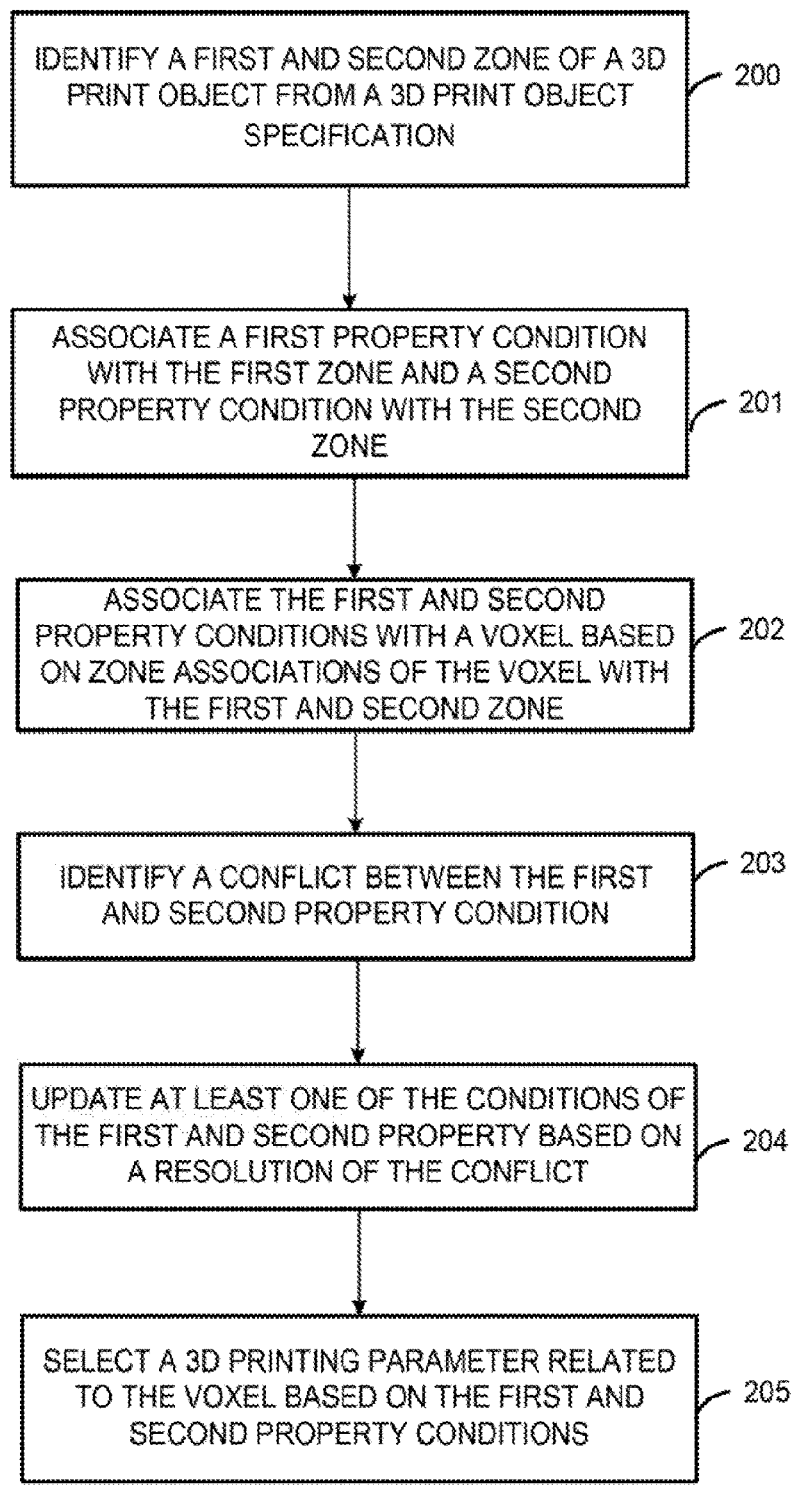
FIG. 2 is a flow chart illustrating one example of a method to select a 3D print parameter based on voxel property association and conflict resolution.

FIG. 2 is a flow chart illustrating one example of a method to select a 3D print parameter based on voxel property association and conflict resolution. For example, a processor may determine properties to associate with a voxel based on higher level target property information associated with a 3D print object design. The processor may determine whether any conflicts exist in the property information associated with a particular voxel and update the property information to resolve the conflicts. Printing parameters may be automatically selected based on the properties associated with the 3D print object on an individual voxel level. The method may be implemented, for example, by the computing system 100 of FIG. 1.

Beginning at 200, a processor identifies a first and second zone of a 3D print object from a 3D print object specification. For example, the first and second zone may overlap. In one implementation, a set of properties is associated with a 3D print object. For each property, the 3D print object may be divided into zones related to different conditions associated with the particular property. For example, the condition may be related to whether the property is present, a threshold, or range for the property value.

The zone may be created in relation to any suitable 3D print object description, such as a CAD description, STL description, parameterized shape, or scanned document. The 3D print object description may be received by the processor, such as via a network or from a storage. The zone may be associated with any suitable section of the 3D print object, such as a portion of the interior of the shape of the 3D print object. The zone may include any amount or dimension of the 3D print object, such as where the zone includes a three-dimensional portion of the interior of the 3D print object. The zone may encompass the entire 3D print object, such as where a property is associated with the entire object or may encompass a portion of the 3D print object. The zone may encompass non-contiguous areas associated with the property condition. The zone may be associated with a layer of the shape of the 3D print object, such as a layer of a particular width at a particular depth from the surface, such that the zone is dependent on the shape of the 3D object.

The zone may be identified based on any suitable information, such as based on stored information and/or user input. In one implementation, the processor causes a user interface to be displayed to receive user input related to the boundary of a zone and identifies the zone based on the received input. As an example, the user interface may allow a user to segment portions of the 3D print object into zones using a free form drawing or selection method. The zones may be identified based on higher level information associated with the object or stored information associated with the object that the processor translates into features and property conditions. In one implementation, the processor receives target object property information and automatically divides the object into zones with different properties in order to achieve the overall target object property.

In one implementation, a zone may cover the entire object. For example, a first zone may include a property value of a first property applicable to the entire object, and a second and third zone may be related to a second property where half of the object is covered by a first value of the second property and half of the object is covered by a second value of the second property.

Continuing to 201, a processor associates a first property condition with the first zone and a second property condition with the second zone. The processor may determine the conditions in any suitable manner, such as based on user input specific to the particular zones and/or target property information associated with a larger segment of the 3D print object or the 3D print object as a whole. The property may be any suitable property. The properties may be function or process specific, such as related to elasticity, conductivity, and/or cooling agent distributions. For example, the first zone may be associated with a mechanical strength property and the second zone may be associated with a thermal resistance property. The first and second property conditions may be related to different properties or different conditions associated with the same property.

The processor may store the zone and property information to be used to associate with a voxel representation. The processor may store the zone and property information such that individual properties represent layers on top of the 3D print object, and each layer includes zones associated with different conditions of the property. The information may be stored in any suitable format, such as in an XML format. The property information associated with each zone may be any suitable property information, such a Boolean value, ceiling, floor, range, or exact value. The property information may be associated with interaction information. The interaction information may be stored separately or associated with the particular layer and/or property. The interaction information may include Navier-Cauchy information, thermo-expansion information, Joule heating information, or other information related to how the property may interact with other properties.

Continuing to 202, a processor associates the first and second property conditions with a voxel based on zone associations of the voxel with the first and second zone. For example, the processor may create a voxel representation of the object, and the processor may determine any zone membership associated with each voxel. The processor may iterate through each voxel and determine zone membership associated with each voxel based on the set of property layers and the zone boundaries within each property layer associated with the object design specification. The processor may use a parallel method, such as a GPU-based parallel processing method and/or multi-threaded CPU computing method, to voxelize the object and/or to associate property and other feature information with individual voxels.

The processor may determine whether a voxel is associated with a zone and the associated property based on the zone boundary. Different types of zone boundaries may be used for different properties, such as based on the shape of the object and/or information about the target boundary method. The processor may associate voxels based on distance from a zone boundary, based on shape of the object at the voxel position, and/or based on a simulation. The property associated with a voxel may be the same for each voxel within the boundary of a zone or may be different depending on position within the zone or other information related to a particular voxel or set of voxels within the zone. In one implementation, associating a set of voxels with the zone based on the shape of the object includes associating a property decay according to distance from the zone boundary, zone center, or other zone location. For example, the property value may decrease for voxels within the zone farther from the zone center.

A zone may be associated with a variable indicating the distance from the zone boundary for which a voxel may include property information associated with the zone. The zone boundary may be associated with a distance from the zone boundary, within, and/or outside of the zone boundary. A distance variable may have a sign or other indication to designate whether the boundary is within or outside of the boundary. The variable may include a range such as a larger distance inside the boundary than to outside of the boundary. The variable may be automatically determined and/or determined based an user provide information.

The processor may associate the property information with the voxel in any suitable manner. The processor may use any suitable method to associate a distance or other position metric with a voxel, and the associated information may be used to determine whether a voxel is to be associated with a particular zone. The processor may determine that the voxel is object of a particular zone and associate the zone condition with the voxel. As an example, the 3D print object may be represented as an octree with each node representing a voxel. The payload for a voxel node may include information about the set of associated properties.

Continuing to 203, a processor identifies a conflict between the first and second property conditions. The processor may identify the conflict prior to associating the set of properties with the voxel and/or as a second processing set to iterate through the voxels to determine conflicts.

The processor may identify any suitable type of conflict, such as a conflict between the simultaneous presences of different properties associated with a voxel and/or a conflict between the conditions associated with the different properties. The processor may identify a type or other information associated with the conflict. For example, the processor may identify an exclusive conflict indicating that two properties cannot be associated with the same voxel. In one implementation, the processor identifies conflicts related to the same property, such as where a voxel is associated with multiple values of the same property.

The processor may identify the conflict in any suitable manner, such as based on interaction information associated with the particular voxel, stored information about property interactions, and/or a simulation based on the proposed set of property conditions.

Continuing to 204, a processor updates at least one of the conditions of the first and second property based on a resolution of the conflict. The processor may select the value of one of the first and second property and update the other value or update both values. A conflict may exist between any number of properties, such as where a voxel is assigned to 3 different properties such that the individual values conflict with one another. The processor may update the values differently based on the type of conflict, such as whether an exclusive conflict or a conflict arising due to quantitative conditions associated with a property. Updating the values may involve removing one of the two properties or setting it to false, updating a condition associated with a property, and/or updating interaction information associated with a property. For example, the processor may change the condition to false such that the property is not present or change a quantitative setting associated with the property. The processor may select an updated property value based on additional properties associated with the voxel, based on conflict resolution rules, and/or based on user selection. The processor may use any suitable method to select which property value to update and to determine the updated value. For example, the processor may determine a pareto optimal solution between the first and the second property.

Continuing to 205, a processor selects a 3D printing parameter related to the voxel based on the first and second property conditions. The processor may select a material or process based on a set of voxels to be created together. In one implementation, the processor may select a different material or process based on the size or number of the set of voxels with the same property. The selected material may be a powder or fluid. For example, the fluid may be a liquid functional agent, such as a fusing or cooling agent. The selected process type may include a machine selection, temperature setting, time associated with a step, or other process related parameter. The processor may select different materials and/or processes for printing different sets of voxels such that the final product is a heterogeneous product.

The processor may display, store, and/or transmit the selection such that the 3D object may be printed according to the selection. In one implementation, an octree representation updated with non-conflicting properties is processed for printing. For example, a property vector may be mapped to a material and/or process vector that is then used for printing. The processor may print the objecting using the selection or cause the object to be printed using the selection.

Figure 3A:
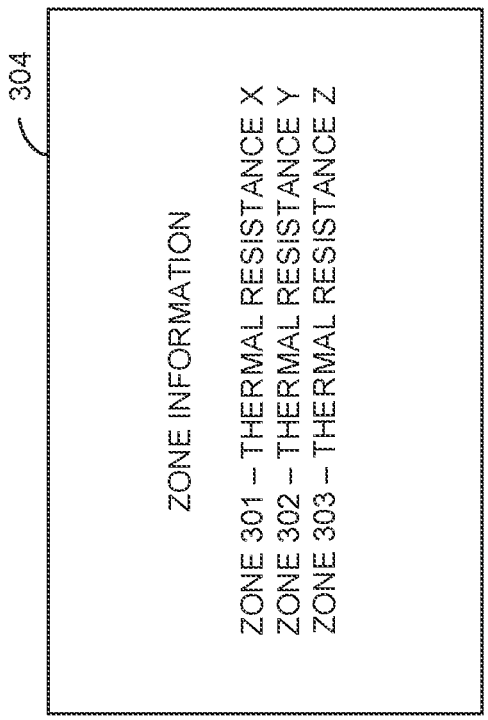
FIGS. 3A and 3B illustrate examples of associating properties with different areas of a 3D print object.
Figure 3A:
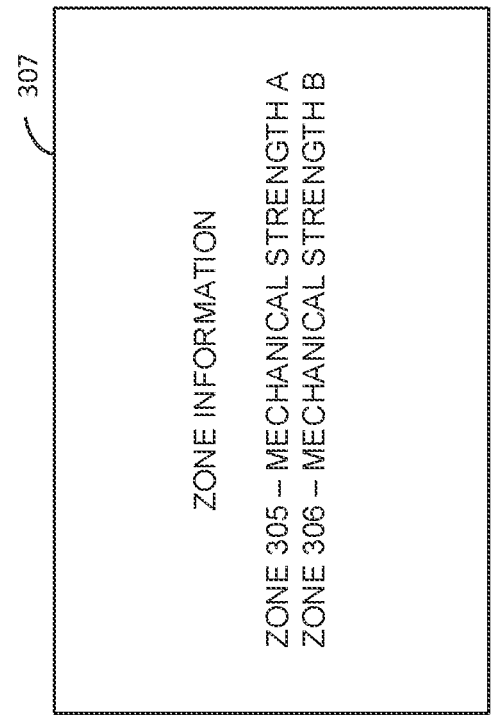
Figure 3B:
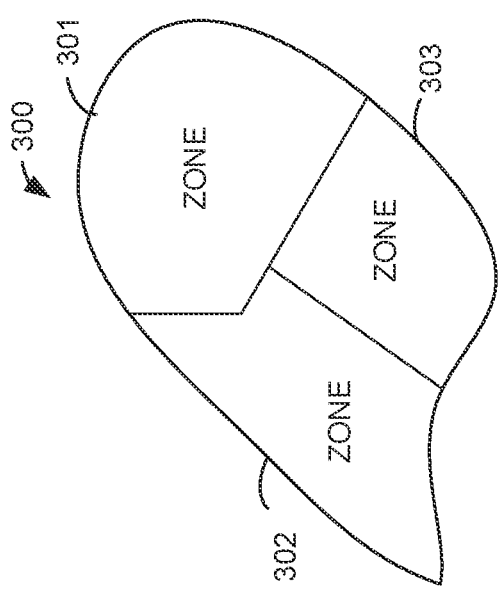
Figure 3B:
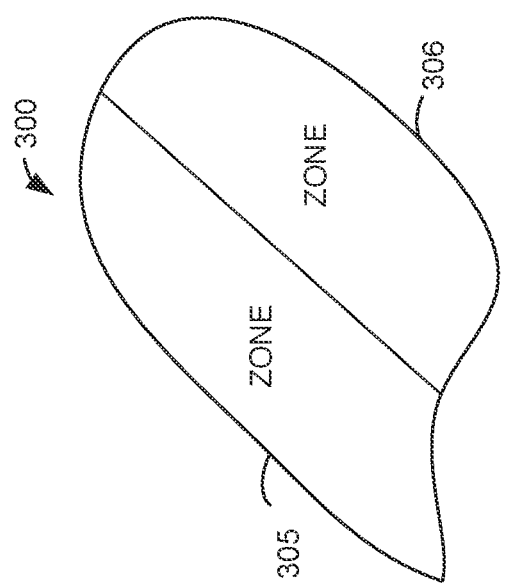

FIGS. 3A and 3B illustrate examples of associating properties with different areas of a 3D print object. For example, a first set of zones may be associated with a first property where the condition of the property is different for each zone, and a second set of zones may be associated with a second property such that the condition of the second property is different for each of the zones in the second set of zones. The first set of zones and second set of zones may be overlapping. For example, each of the sets may include layers covering the entire object such that the boundaries of the layers differ for the different sets of zones.

FIG. 3A shows a 3D print object specification 300. The 3D print object is divided into zones 301, 302 and 303. Block 304 shows the property conditions associated with each zone. For example, zones 301, 302, and 303 are each associated with a thermal resistance property. The condition for the thermal resistance property is different for each zone. For example, the value for zone 301 is X, and the value for 302 is Y.

FIG. 3B shows the 3D print object specification 300 divided into a second set of zones associated with a second property. The zones 305 and 306 are associated with a mechanical strength property such that each zone is associated with a different mechanical strength property condition. Block 307 shows the property conditions associated with each zone. For example, the value is A for zone 305 and B for zone 306. The two sets of zones are overlapping such that an individual voxel within zone 305 may also have the properties associated with zone 301. A processor may resolve conflicts between properties associated with the same voxel.

Figure 4:
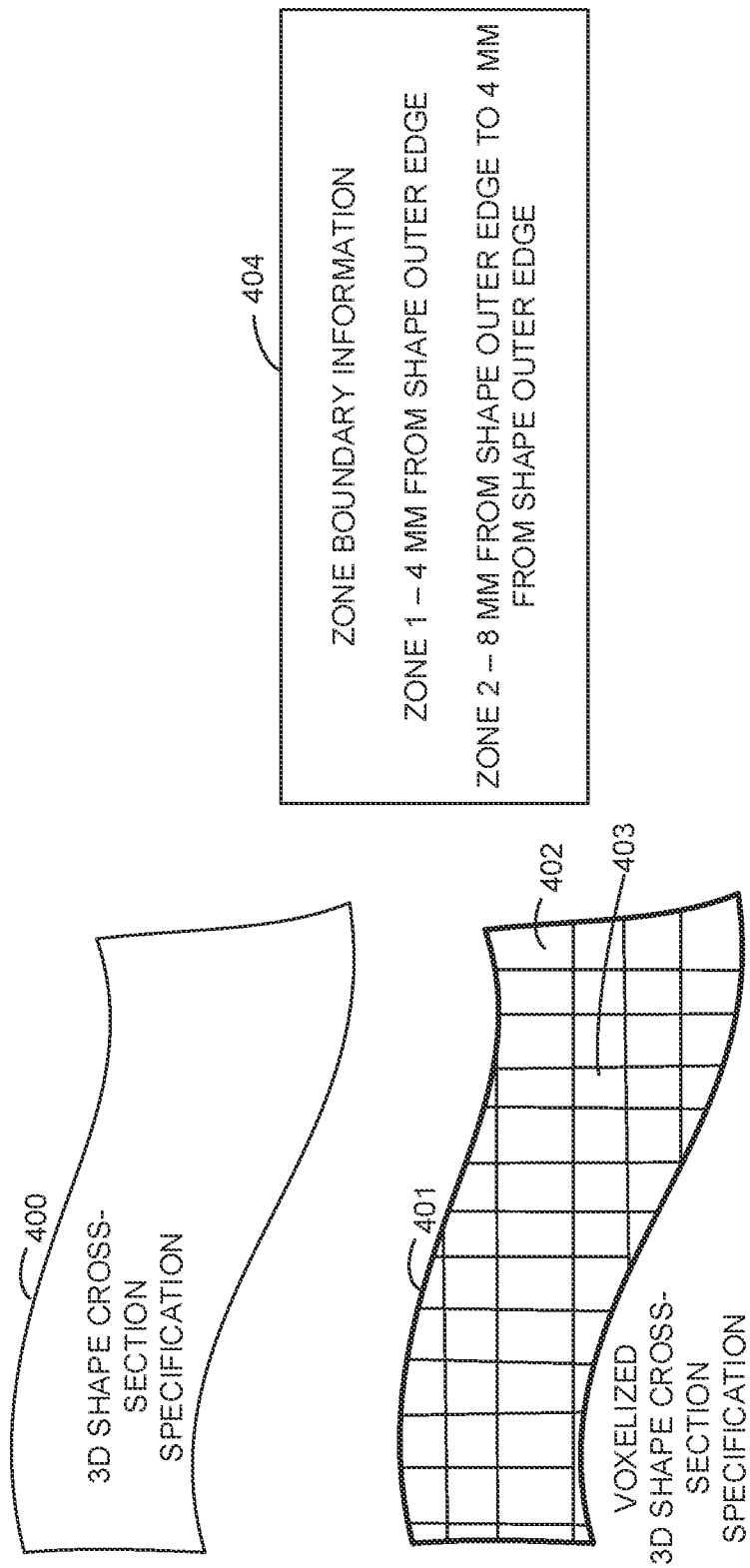
FIG. 4 is a diagram illustrating one example of associating a voxel with a zone of a 3D print object specification.

FIG. 4 is a diagram illustrating one example of associating a voxel with a zone of a 3D print object specification. Shape specification 400 shows a cross section of a 3D print object design. Voxel representation 401 shows a cross section of a voxel representation of the shape specification 400. For example, a processor may create an octree or other representation of the interior volume of a 3D print object. The voxel representation 401 shows individual voxels of the shape which may be stored as nodes in a tree representation. Block 404 shows boundary information associated with zones of the shape specification 400. For example, the zone includes layers from a particular distance of the edge of the shape.

The voxel representation 401 includes multiple voxels of the 3D print object. For example, voxel 403 is more interior and voxel 402 is near the outer edge of the 3D print object. A processor may determine zone membership differently based on the position of the voxel within the representation such that voxels farther from the surface are determined less rigorously to conserve computing power. Position information related to the distance of the voxel to the surface of the object or distance information from the center of one voxel to the next voxel node may be stored as part of the payload of a node in a tree data structure or other data structure representing the object voxels.

The processor may determine whether a voxel is within a zone boundary based on an area of influence by the voxel. For example, a distance value representative of an area of influence of a voxel may be used to determine whether the voxel is within the boundary of a zone, such as compared to zone boundary rules associated with the zone. The distance information may be determined with more precision for voxels closer to the surface. For example, a voxel closer to an interior or exterior surface of the 3D print object may be analyzed with more precision. For a fine voxel closer to the surface of the 3D object, the processor may determine an area of the object influenced by the voxel. For example, the processor may determine an area of influence around the fine voxel. The area of influence may be determined by a parameter that may indicate a number of voxels or a length in a direction that is considered to be within the area of influence. The area of influence may be circular or may extend different distances in different directions. In one implementation, the processor determines the distance between the voxel center voxel to each triangle or other object, such as a quad, that is used to define the object surfaces within the area of influence. The processor may record the minimum of the determined distances as the distance from the surface to be used for determining zone membership for the voxel. For example, the processor may determine the minimum distance from the center of the voxel to the projection point of the voxel center to the plane defined by any triangle within the circle of influence to determine a distance to associate with the voxel. The associated distance may be compared to zone boundary information to determine whether the voxel is a member of the particular zone. If the voxel is associated with the zone, the properties of the zone are associated with the voxel. In some cases, the properties may be associated based on the size of the distance. The distance related to voxel 401 may be determined using the fine voxel method and compared to the zone boundary information in block 404.

For a voxel closer to the interior of the 3D shape, the processor may determine the position information based on information determined for the fine voxels. For example, the processor may select a relevant fine voxel to associate with the coarse voxel, such as the nearest fine voxel center to the particular coarse voxel center, and use position information associated with the selected fine voxel to determine information about the coarse voxel. The processor may aggregate the distance information related to the selected voxel with the distance information related to the distance between the coarse voxel and the selected voxel. For example, the processor may add the two distances and use the resulting distance as the distance of the coarse voxel from the surface or other delimiter. The distance related to voxel 403 may be determined using the coarse voxel method and compared to the zone boundary information in block 404.

Figure 5:
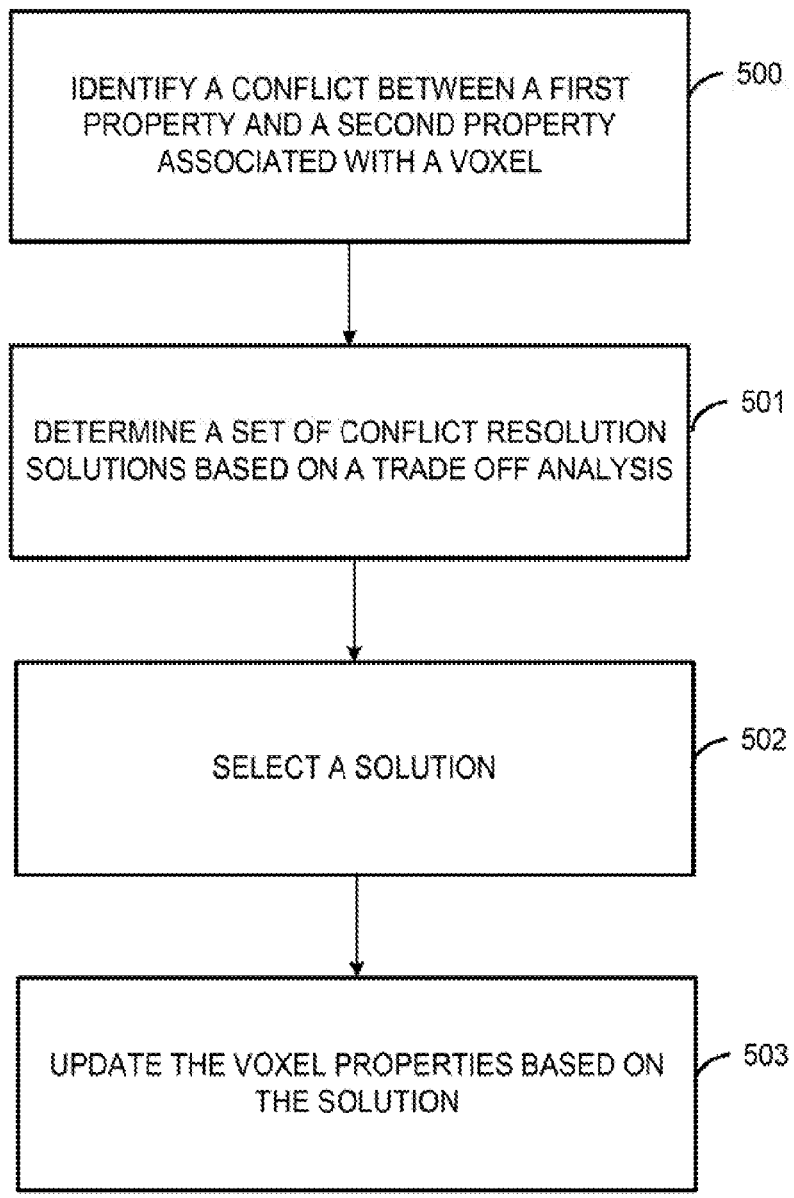
FIG. 5 is a flow chart illustrating one example of a method to resolve a conflict between a set of properties of a 3D print object.

FIG. 5 is a flow chart illustrating one example of a method to resolve a conflict between a set of properties of a 3D print object. The method may be used to update a property associated with a voxel, such as a voxel node in an octree or other representation of the volumetric information associated with an object to be 3D printed. The method may be implemented, for example, by the computing system 100 of FIG. 1.

Beginning at 500, a processor identifies a conflict between a first property and a second property associated with a voxel. The conflict may be any suitable conflict, such as where the conditions associated with two properties may not be simultaneously present. As an example, the presence of properties A and B may preclude property C from being present in the same area of the 3D print object. The processor may identify the conflict in any suitable manner, such as based on stored data and/or execution of a simulation. The property information associated with the voxel may include interaction information that may be used to identify the conflict.

Continuing to 501, the processor determines a set of conflict resolution solutions based on a trade-off analysis.

For example, for a pair of conflicting properties, removing or updating a condition associated with either property may resolve the conflict. The processor may determine a set of possible solutions. The processor may determine preference information associated with each solution, such as based on its effect on other properties or voxels.

Continuing to 502, the processor selects a solution. The selection may be based on stored and/or received information. In one implementation, the processor causes a user interface to be displayed that provides information about the conflict and receives user input related to the resolution. For example, the user may confirm a suggested resolution, select one of a set of resolution possibilities, override the alert as not including an actual conflict, and/or provide a manual property update to resolve the conflict. In one information, the processor selects a solution and/or prioritizes possible solutions to be presented to a user based on stored rules for conflict resolution prioritization and response.

Continuing to 503, the processor updates the voxel properties based on the solution. The processor may update the properties in any suitable manner, such as by updating a data structure for associating properties with individual voxels and/or sets of voxels. In one implementation, a node in a tree representation is associated with a voxel, and a payload associated with the node is updated to represent the updated voxel properties. Automatically updating the voxel level properties may allow a heterogeneous object to be printed based on target feature information that is propagated at the voxel level to provide voxel level parameter selection.

The invention claimed is:

1. A computing system, comprising:
a processor to:
identify a zone of a 3D print object design;
associate a first property condition with the zone;
create a voxel representation of the 3D print object design;
associate the first property condition with a voxel in the voxel representation based on an association between the zone and the voxel;
detect a conflict of the first property condition and a second property condition for the voxel, wherein the conflict indicates an inability of a single material to satisfy both the first property condition and the second property condition;
update the first property condition based on the conflict with the second property condition associated with the voxel;
select at least one of a material and a process for 3D printing the object according to the updated first property condition and the second property condition; and
print the 3D print object according to the selected 3D printing parameter.

2. The computing system of claim 1, wherein the first and second property condition relate to at least one of a mechanical strength property and a thermal resistance property.

3. The computing system of claim 1, wherein the processor is further to cause a user interface to be displayed to receive user input related to the boundary of the zone, and where identifying the zone comprises identifying the zone based on the received user input.

4. The computing system of claim 1, wherein the processor is further to associate the voxel with the zone based on distance from the voxel to the zone boundary.

5. The computing system of claim 1, wherein associating the voxel with the zone comprises associating the voxel based on at least one of the shape of the object at the voxel position and a simulation.

6. The computing system of claim 1, wherein associating the first property condition comprises associating a value of the first property condition based on a distance of the voxel from the zone boundary.

7. The computing system of claim 1, wherein a zone is defined based on a distance from a surface of the object.

8. The computing system of claim 1, wherein a payload for a voxel node includes information about a set of associated properties.

9. The computing system of claim 1, wherein updating the first property condition based on a conflict is based on a type of conflict.

10. A method, comprising:
identifying, by a processor, a first and second zone of a 3D print object from a 3D print object specification;
associating a first property condition with the first zone and a second property condition with the second zone;
associating the first and second property conditions with a voxel based on zone associations of the voxel with the first and second zone;
identifying a conflict between the first and second property conditions, wherein the conflict indicates an inability of a single material to satisfy both the first property condition and the second property condition;
updating at least one of the conditions of the first and second property based on a resolution of the conflict;
selecting a 3D printing parameter and material assignment related to the voxel based on the first and second property conditions; and
printing the 3D print object according to the selected 3D printing parameter.

11. The method of claim 10, further comprising determining the boundary of the first zone based on a zone distance threshold.

12. The method of claim 11, wherein determining the distance of the voxel compared to the first zone boundary is based on the position of the voxel in relation to the surface of the 3D print object.

13. The method of claim 10, further comprising causing a user interface to be displayed to receive user input related to delineation of the first zone.

14. The method of claim 10, further comprising blending the first property condition and the second property condition at a border of the first zone and the second zone.

15. The method of claim 10, further comprising associating a property decay within at least one of the first zone and the second zone.

16. The method of claim 10, further comprising determining whether a voxel is within a zone based on an area of influence of the voxel.

17. A machine-readable non-transitory storage medium comprising instructions executable by a processor to:
assign a first property to voxels of a 3D print object based on a first and second zone associated with the first property including the voxels and a first condition of the first property associated with the first zone and a second condition of the first property associated with the second zone;
assign a second property to the voxels of the 3D print object based on a third and fourth zone associated with the second property including the voxels and a first condition of the second property associated with the third zone and a second condition of the second property associated with the fourth zone;

update the first property and the second property to resolve conflicts between the properties;

select a 3D printing parameter and material assignment based on the assigned properties; and print the 3D print object according to the selected 3D printing parameter.

18. The machine-readable non-transitory storage medium of claim 17, further comprising instructions to assign the voxels to the first and second zone based on boundary information associated with the first zone and boundary information associated with the second zone.

19. The machine-readable non-transitory storage medium of claim 17, wherein instructions to update the assigned properties comprise instructions to determine a pareto optimal solution between the first and the second property conditions.

20. The machine-readable non-transitory storage medium of claim 17, wherein instructions to select 3D printing parameter comprises instructions to select at least one of a powder type, liquid functional agent type, or process type.

* * * * *